United States Patent Office 2,929,706
Patented Mar. 22, 1960

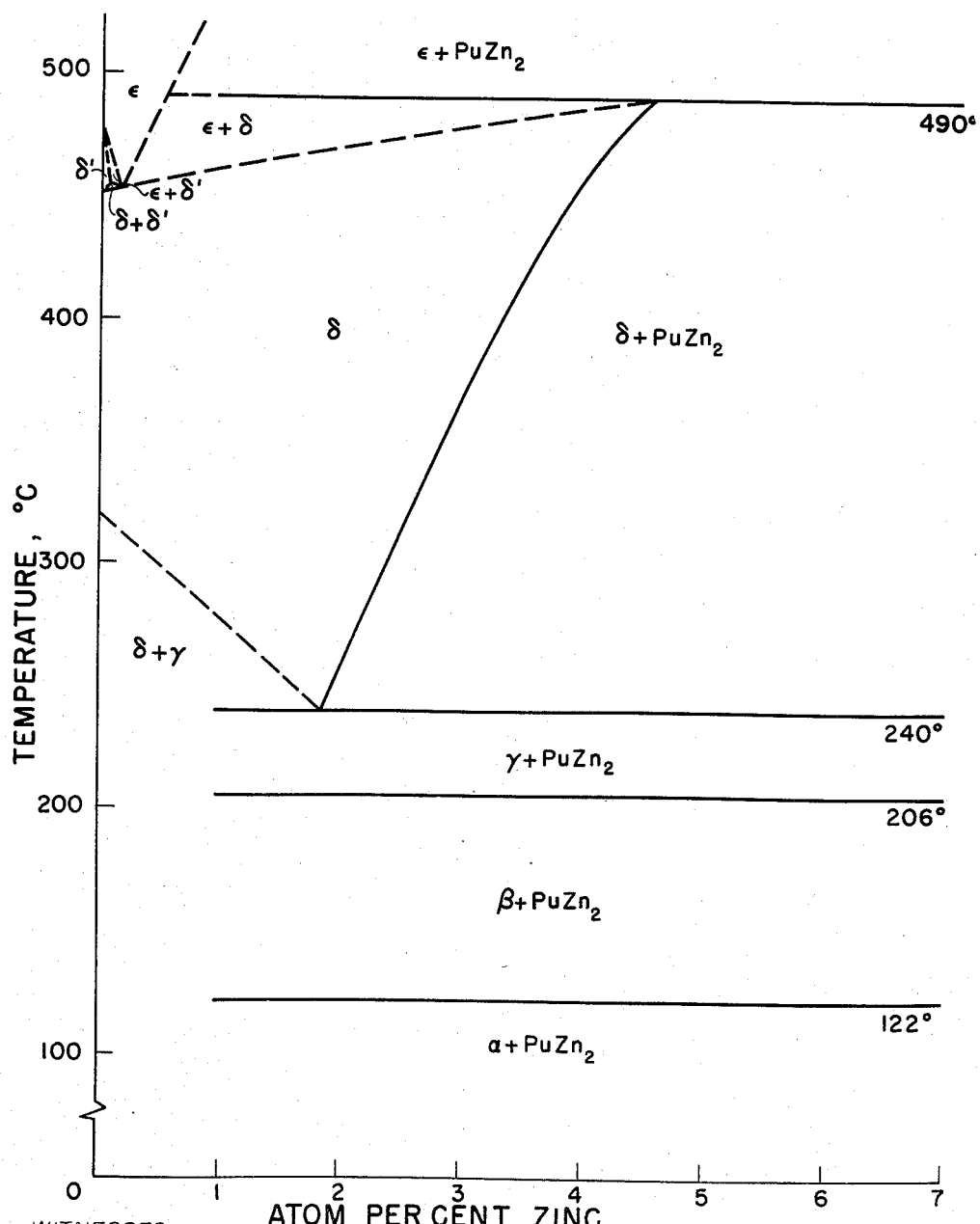

2,929,706
DELTA PHASE PLUTONIUM ALLOYS

Eugene M. Cramer, Espanola, Finley H. Ellinger and Cletis C. Land, Los Alamos, N. Mex., assignors to the United States of America as represented by the United States Atomic Energy Commission Application April 21, 1959, Serial No. 807,962

3 Claims. (Cl. 75—122.7)

The present invention relates to alloys of plutonium and more specifically to delta phase plutonium-zinc alloys which are useful in neutronic reactors as the fuel of such reactors.

Neutronic reactors in which the fuel element has been essentially pure plutonium have been constructed and successfully operated. One example of such a reactor is the Los Alamos fast reactor known as "Clementine," fully described in AEC LA-1679, available from TIS, Oak Ridge, Tenn. However, unalloyed plutonium has many physical properties which make its use undesirable in a neutronic reactor. For example, the delta phase of unalloyed plutonium occurs in a narrow temperature range and readily transforms on heating or cooling to other crystal modifications with simultaneous increases in density. In addition, this delta or face-centered cubic phase has a negative coefficient of thermal expansion (approximately minus $9 \times 10^{-6}$ in./in.° C.). Such characteristics of density and thermal expansion have serious effects on the reactivity of a neutronic reactor as the criticality of the reactor will increase as the temperature rises, thereby resulting in a dangerous condition. Also, unalloyed plutonium is of relatively high density and difficult to mechanically work into fuel elements. Hence it is desirable to alloy the plutonium atoms with some foreign element to improve its neutronic and fabrication characteristics. However, the choice of a foreign element is not a matter which can be settled by the selection of almost any available metal because of the following strict requirements which should be met for reactor use:

(1) A neutronic compatibility with the system. The element must not be a strong absorber of neutrons in the energy range of the neutrons of the reactor system.

(2) An improvement of the fabrication characteristics of plutonium. The added element should facilitate production of an alloy which can be fabricated into fuel elements with considerable ease.

(3) A ready alloying with the plutonium. The added element should alloy with plutonium readily so that the preparation of the alloy is a simple metallurgical process.

(4) An absence of phase transformations upon temperature changes within and below the operating range. The normal phase transformations occurring in pure plutonium are accompanied by relatively large undesirable volume changes. Such reactions would cause distortion of the fuel elements and impose higher stresses on the fuel container.

(5) An improvement in corrosion resistance. In most neutronic reactors, corrosion of the fuel elements is a problem and since plutonium does not exhibit especially good corrosion resistant properties, it is highly desirable that the alloying element improve the resistance to any kind of corrosion to which the fuel element might become subjected.

It has been found that the element zinc when added to plutonium to produce a delta phase alloy will meet the above stringent requirements.

It is therefore an object of this invention to provide alloys of plutonium and zinc having good neutronic, corrosion and fabrication characteristics.

Another object of this invention is to provide homogeneous alloys of plutonium and zinc having good dimensional characteristics throughout the operating temperature range of a neutronic reactor.

Further objects of this invention will be apparent from the following description and claims and the drawing hereby made a part of the specification in which the figure shows the plutonium rich portion of the equilibrium phase diagram for the plutonium-zinc system.

The preferred embodiment of the present invention comprises an alloy system of plutonium and zinc consisting essentially of from about 1 to about 4 atom percent zinc and the balance plutonium, the alloys having the face-centered cubic structure of delta phase plutonium. The percentages referred to here and everywhere in this specification are atomic percentages and abbreviated by the symbol "a/o."

Properties of the alloys

It is known that unalloyed plutonium is composed of a face-centered cubic, delta phase between the temperatures of from approximately 320° to 450° C., of a delta prime phase between approximately 450° and 475° C., and of an epsilon phase from approximately 475° C. to the melting point of about 640° C. Although the delta phase of pure plutonium has certain undesirable characteristics, as aforementioned, it has been found that the delta phase when occurring in plutonium alloy systems has excellent fabrication properties and improved corrosion resistance. Alloying with zinc to form a delta phase alloy minimizes or eliminates the undesirable phase and dimensional change characterisitcs of pure plutonium within the temperature range between 300° C. and 490° C.

It has been found that the delta phase can be metastably retained at low temperatures, e.g., room temperature, when the zinc content is greater than 1 a/o. The delta phase alloys are of relatively low density and are softer and less brittle at room temperature and more easily workable into fuel elements than the alpha phase mixture normally occurring at room temperature. For example, while the alpha phase under optimum conditions has a density of 19.8 gm./cm.³, the metastably retained delta phase alloys have the following densities at room temperature:

| Atom percent Zn: | Density in gm./cm.³ |
|---|---|
| 1.5 | 15.94 |
| 1.8 | 15.85 |
| 2.2 | 15.75 |
| 2.9 | 15.71 |
| 3.4 | 15.70 |
| 3.9 | 15.64 |

Because the delta phase Pu-Zn alloys are metastable at room temperature, they will work harden rapidly; however, the delta phase can be regained through utilization of heat treatment techniques well known to the art, such as a solution heat treatment at about 450° C. followed by a rapid quench to room temperature. If the alloys of the present invention are used as a nuclear reactor fuel at an operating temperature of from 300° C. to 490° C. retention of the delta phase is assured, as can be seen from inspection of the phase diagram of the accompanying drawing. Since these alloys are homogeneous, no hot spots or undue concentration of fission fragments will occur in the fuel elements.

When plutonium is alloyed with increasing amounts of zinc the coefficient of thermal expansion becomes less negative and then turns positive, the turning point occurring at about 3.4 a/o zinc content, as shown by the results of tests conducted within the temperature range between 280° C. and 430° C. Therefore those alloys of the present invention which have a zinc content of from 3.4–4 a/o possess positive coefficients of thermal expansion. Thus, when these alloys having positive coefficients of thermal expansion are used in neutronic reactors a rise in temperature causes a decrease in density with a decrease in criticality, thereby resulting in a self-limiting condition of criticality.

*Preparation*

The alloys of the present invention can be prepared and cast in a vacuum. However, due to the loss of zinc by volatilization during heating, an alloy whose composition is to be closely regulated is better prepared and cast in a hermetically sealed tantalum crucible containing helium and argon. The metals are placed in a tantalum crucible in the proportions desired in the final alloy, and the crucible is then sealed by welding on a tantalum cover. The welding is performed by the inert-arc technique, thereby leaving an atmosphere of the inert gas within the crucible. The crucible is then heated and maintained at a temperature of about 1050° C. for about 15 minutes. (If the contents of the crucible can be agitated, as by shaking the crucible, then no high-temperature holding time is required.)

If the final composition of the delta phase alloy is not overly critical the components can be placed in a tantalum crucible in a furnace containing a protective atmosphere of an inert gas. An excess of zinc should be provided to account for loss during exothermic reactions, an excess of from 30 to 50 percent providing a safe margin. To reduce the zinc loss due to exothermic reactions a master alloy, corresponding in composition to the intermetallic compound $PuZn_2$, can be first prepared and then combined with additional plutonium, depending upon the desired composition. When plutonium is alloyed in this manner, exothermic reactions do not occur and only relatively low temperatures are required to obtain uniform melts. The plutonium and an excess of master alloy are placed in an open tantalum or refractory crucible and placed in a vacuum furnace. The furnace is first purged by evacuation and then filled with an inert gas at about atmospheric pressure. The temperature of the furnace is then raised to maintain the crucible at a temperature of 850° C. for about 15 minutes.

The delta phase alloys are metastably retained at room temperature upon a homogenization treatment. Reference to the accompanying figure will show a temperature of about 450° C. to be a suitable homogenization temperature, and a treatment time of 200 hours should be more than adequate for any composition of delta phase alloy.

The plutonium used in the alloys of the present invention is at least 98 to 99 a/o pure and does not contain significant amounts of neutron-absorbing elements. Although a plutonium of lesser purity could be used if the impurities were not neutron-absorbing elements, the purities specified are easily achieved and generally expected in the reactor art. The alloying metals must be of a correspondingly high neutronic and chemical purity.

Thus there have been described new delta phase plutonium-zinc alloys suitable for use as a neutronic reactor fuel and easily workable into homogeneous fuel rods.

What is claimed is:

1. An alloy for a neutronic reactor fuel consisting essentially of from 1 to 4 atomic percent zinc and the balance plutonium, the structural constitution of said alloy being essentially delta phase plutonium.

2. An alloy for a neutronic reactor fuel for operation between 300° C. and 490° C. consisting essentially of from 1 to 4 atomic percent zinc and the balance plutonium, the structural constitution of said alloy being essentially delta phase plutonium.

3. An alloy for a neutronic reactor fuel consisting essentially of from 3.4 to 4 atomic percent zinc and the balance plutonium, the structural constitution of said alloy being essentially delta phase plutonium.

References Cited in the file of this patent

"Reactor Core Materials," published by Batelle Memorial Institute, May 1958, vol. 1, No. 2, page 9.